Nov. 21, 1961   E. MAYER   3,009,718
SLIDE RING SEAL
Filed April 10, 1959
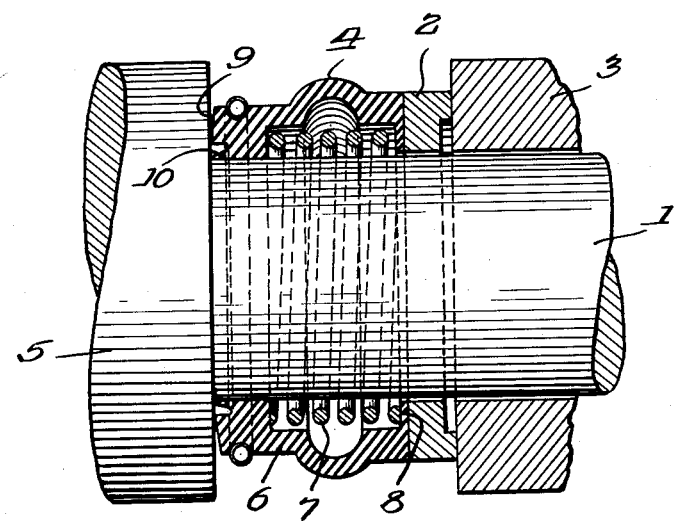
Inventor.
Erhard Mayer.
By
Atty.

United States Patent Office 3,009,718
Patented Nov. 21, 1961

3,009,718
SLIDE RING SEAL
Ehrhard Mayer, Stuttgart, Germany, assignor to Goetzewerke Friedrich Goetze Aktiengesellschaft, Burscheid, near Koln, Germany, a corporation of Germany
Filed Apr. 10, 1959, Ser. No. 805,438
Claims priority, application Germany May 21, 1958
5 Claims. (Cl. 286—11.15)

This invention is concerned with a slide ring seal for a shaft, wherein a spring resting with one end against an abutment provided on the shaft presses the slide ring proper in sealing engagement with the surface of a machine part to be sealed.

Slide ring seals are known for axially sealing shafts, in which the slide rings are pressed by spring means against a surface to be sealed, for example, against a surface formed by a housing part; the spring resting thereby against an abutment provided on the shaft, which is sealed against the slide ring by a soft rubber ring. There are also slide ring seals known in which the slide ring and the abutment are formed similar to sleeves or bushings and have a rubber ring of circular cross-section disposed therebetween for sealing the parts in radial direction. Other known slide ring seals employ an elastic rubber bellows which connects the slide ring with a rubber member carried by the shaft and engages a shoulder or enlargement formed on the shaft, the spring in such structures bearing against the slide ring and the rubber member. It is moreover known to construct slide ring seals in such a manner that the pressure of the sealing medium additionally presses the slide ring in engagement with the surface to be sealed. However, in these last noted embodiments, the spring is loaded only to the degree depending upon the structural disposition thereof.

It has now been found that the sealing effect of slide ring seals can be considerably improved by allowing the pressure of the medium to be sealed to operate on the slide ring through the spring. The invention accordingly proposes to construct the abutment, provided on the shaft, in such a manner that the pressure of the medium to be sealed may act upon the abutment to displace it upon the shaft in the direction of the slide ring. In the case of embodiments in which the abutment rest against a shoulder or enlargement on the shaft, its rearwardly facing surface may be radially inclined, so that it is always subject to the pressure of the sealing medium. The effective sealing width of the slide ring can in this way be reduced, thereby reducing the amount of wear and enhancing the possibility of using the seal under conditions requiring thermal considerations.

It also is possible to make the rear surface of the abutment accessible to the pressure of the sealing medium, by the provision of recesses which open on the periphery of the abutment. The recesses may be provided in the rear surface or in the body of the abutment. In accordance with the invention, the entry of the sealing medium into the gap between the rear surface of the abutment and the shaft enlargement may be obtained by roughening the rear surface. In order to prevent the passage of the medium to be sealed, between the abutment and the shaft, the invention proposes to provide at the rear surface of the abutment a sealing lip surrounding the shaft, the sealing lip preferably being recessed with respect to the rear surface of the abutment, so as to avoid engagement thereof with the shaft shoulder. In the event an elastic abutment made of rubber is employed, the sealing lip preferably may be made of the same material.

The various objects and features of the invention will appear from the description on an embodiment thereof which is rendered below with reference to the accompanying drawing.

In the drawing, numeral 1 indicates a shaft which is encircled by a slide ring 2 axially movable into engagement with a machine part 3. The slide ring 2 is connected through rubber bellows 4 with the abutment 6 which is in engagement with the shaft enlargement or shoulder 5. Disposed between the abutment 6 and the slide ring 2 is a concentrically positioned compression spring 7, one end of which is engaged with the abutment 6 and the opposite end operatively bearing on the adjacent face of the slide ring 2 through an inwardly directed radially extending flange 8 formed on the adjacent end of the bellows 4, whereby an efficient fluid-tight seal is provided between the latter and the slide ring. The rear end 9 of the abutment 6 extends conically or radially angularly and is provided with an axially recessed sealing lip 10 which surrounds the shaft.

Changes may be made within the scope and spirit of the appended claims which define what is believed to be new and desired to have protected by Letters Patent.

I claim:
1. A slide-ring seal for a shaft, comprising a slide ring, an abutment in engagement with the shaft and forming part of the seal, a compression spring encircling the shaft and adapted to exert an axially effective force, and a flexible member connecting said slide ring and said abutment and enclosing said spring, the latter being operative to exert an axial force on said slide ring to press it against a structural member in response to fluid pressure acting on the rear end of the abutment to displace the latter axially of said shaft in the direction of said slide ring, the surface of the rear end of said abutment being radially inclined in the direction of said slide ring.

2. A slide-ring seal for a shaft, comprising a slide ring, an abutment in engagement with the shaft and forming part of the seal, a compression spring encircling the shaft and adapted to exert an axially effective force, and a flexible member connecting said slide ring and said abutment and enclosing said spring, the latter being operative to exert an axial force on said slide ring to press it against a structural member in response to fluid pressure acting on the rear end of the abutment to displace the latter axially of said shaft in the direction of said slide ring, said flexible member being provided at its end adjacent said slide ring with an inwardly directed, radially extending sealing flange interposed between said slide ring and the adjacent end of said spring with the ends of the latter respectively bearing on said flange and said abutment.

3. A slide ring seal according to claim 2, wherein said abutment is provided with generally radially outwardly extending recesses formed therein.

4. A slide ring seal according to claim 2, comprising a sealing lip formed by said abutment at the rear end thereof and surrounding said shaft.

5. A slide ring seal according to claim 4, wherein said sealing lip is recessed from the rear end of said abutment.

References Cited in the file of this patent

UNITED STATES PATENTS

| 1,905,822 | Dunn | Apr. 25, 1933 |
| 2,365,065 | Frankenfield | Dec. 12, 1944 |
| 2,610,871 | Woodson | Sept. 16, 1952 |
| 2,713,504 | Coleman | July 19, 1955 |